United States Patent
Oberländer

(12)
(10) Patent No.: US 6,704,459 B1
(45) Date of Patent: Mar. 9, 2004

(54) PROCESS AND ARRANGEMENT FOR TRANSFORMING AN INPUT VARIABLE

(75) Inventor: Matthias Oberländer, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/202,413

(22) PCT Filed: Jun. 4, 1997

(86) PCT No.: PCT/EP97/02896

§ 371 (c)(1),
(2), (4) Date: Aug. 13, 2000

(87) PCT Pub. No.: WO97/48070

PCT Pub. Date: Dec. 18, 1997

(30) Foreign Application Priority Data

Jun. 12, 1996 (DE) .......................... 196 23 365

(51) Int. Cl.[7] .............................. G06K 9/36; G06E 1/00
(52) U.S. Cl. ........................ 382/276; 382/156; 382/159; 706/15
(58) Field of Search ................................. 382/276, 155, 382/156, 158, 159; 706/15, 20, 25, 26, 27, 31; 370/360, 254

(56) References Cited

U.S. PATENT DOCUMENTS

| | | | | |
|---|---|---|---|---|
| 4,120,043 A | * | 10/1978 | Su | 708/230 |
| 4,160,128 A | * | 7/1979 | Texier | 370/366 |
| 5,333,238 A | * | 7/1994 | Kakazu et al. | 706/44 |
| 5,345,229 A | * | 9/1994 | Olnowich et al. | 370/360 |
| 5,719,955 A | * | 2/1998 | Mita | 382/158 |

* cited by examiner

*Primary Examiner*—Bhavesh M. Mehta
*Assistant Examiner*—Kanji Patel
(74) *Attorney, Agent, or Firm*—Davidson, Davidson & Kappel, LLC

(57) ABSTRACT

A method for transforming an input variable having a plurality of binary input positions into an m-position output variable in accordance with a predeterminable transformation specification. The transformation is effected in the form of a plurality of input positions or intermediate positions combined group-wise in parallel and sequential partial transformations with intermediate positions being created according to predeterminable, discrete partial assignment specifications. In addition, an arrangement for transforming an n-position input variable having a plurality of binary input positions into an m-position output variable according to a predeterminable transformation specification in the form of a network.

17 Claims, 5 Drawing Sheets

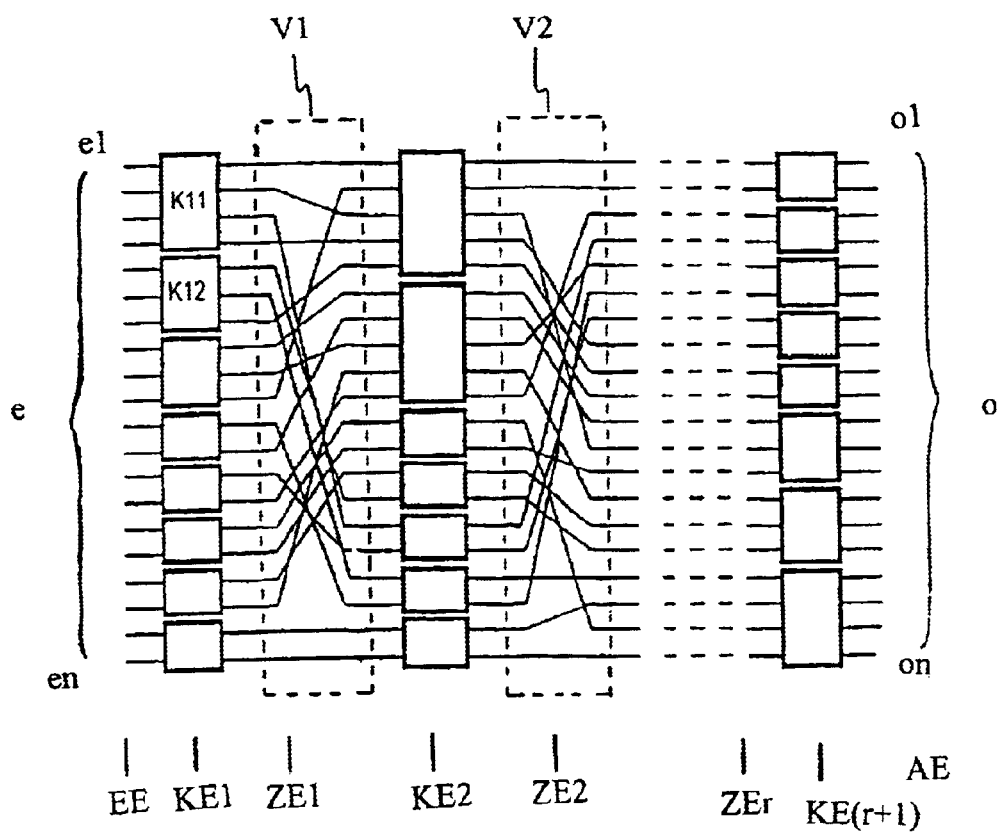
FIG. 2
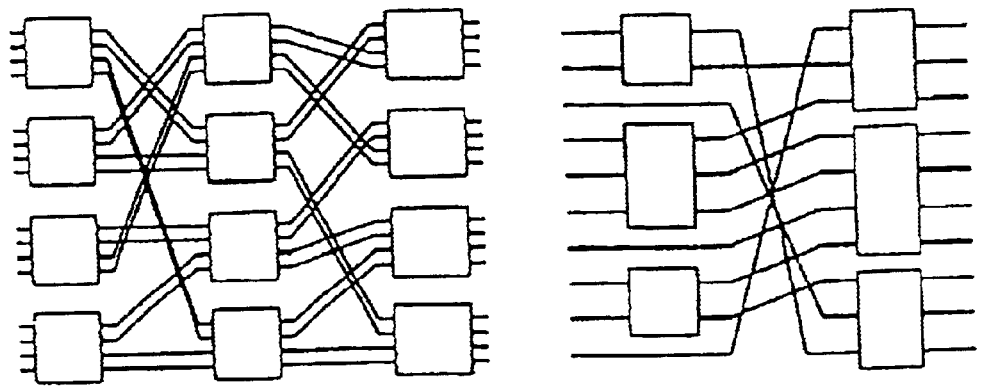
FIG. 3
FIG. 4

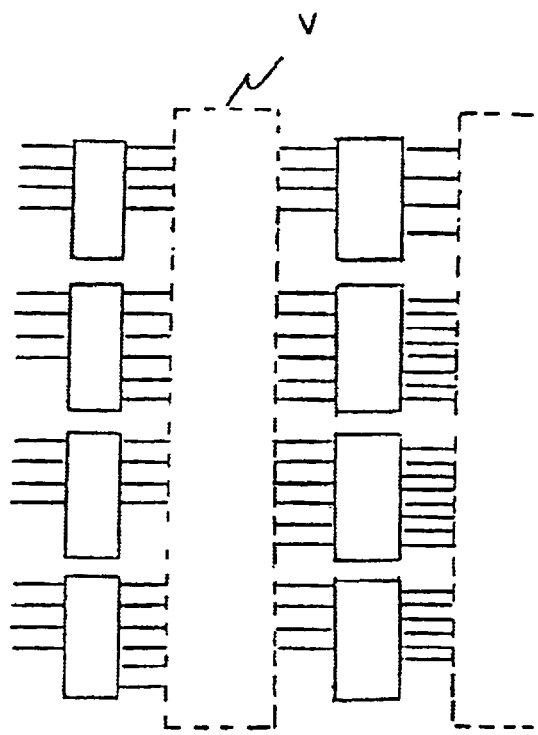
FIG. 5
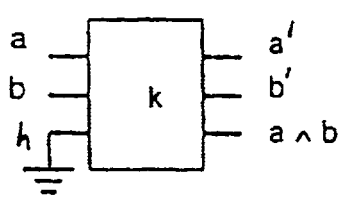
FIG. 6
FIG. 7

US 6,704,459 B1

PROCESS AND ARRANGEMENT FOR TRANSFORMING AN INPUT VARIABLE

BACKGROUND

The invention relates to a method and an arrangement for transforming an input variable.

Transforming variable input signals is a task that must be performed in numerous areas of digital signal processing. Often, the objective is to extract the problem-relevant content of an input signal encompassing a large variation range, with as little information as possible being lost.

For example, in machine-based image evaluation, a typical problem associated with an input signal present in the form of binary pixel values of a raster image is determining whether the investigated image or a portion thereof can be categorized under one of possibly several specific, predetermined object classes. The major-axis transformation and the so-called neural networks, for example, are frequently used in this connection. Because of the necessary computing capacity, however, these known procedures demonstrate a limited adaptability to arbitrary images, and only a low data throughput in real-time operation.

SUMMERY OF THE INVENTION

It is the object of the present invention to provide a method and an arrangement for transforming an input variable with a high adaptability to a priori, arbitrary images and a high processing speed.

Solutions to this object in accordance with the invention are disclosed in the independent claims. The dependent claims list advantageous embodiments and modifications of the invention.

In principle, the invention permits the realization of arbitrary, discrete transformations without arithmetic operations. The dimension of the partial-assignment specifications can advantageously be kept small. The transformation can be effected with the use of a programmable digital computer, as well as by means of a network having electronic modules in the network nodes and connecting lines between the nodes. The use of a network is especially advantageous for the real-time processing of digital signals, for example in image recognition, because of the attainable high processing speed. The components used as network nodes are preferably programmable read-only memories, particularly so-called EEPROMS.

BRIEF DESCRIPTION OF THE DRAWINGS

The invention is described in detail below by way of examples. Shown are in

FIG. 2 a section of a network;

FIGS. 3, 4 further examples of network sections;

FIG. 5 the dimension expansion at network nodes;

FIGS. 6, 7 an example of a network node having an expanded dimension; and

Figure 1:
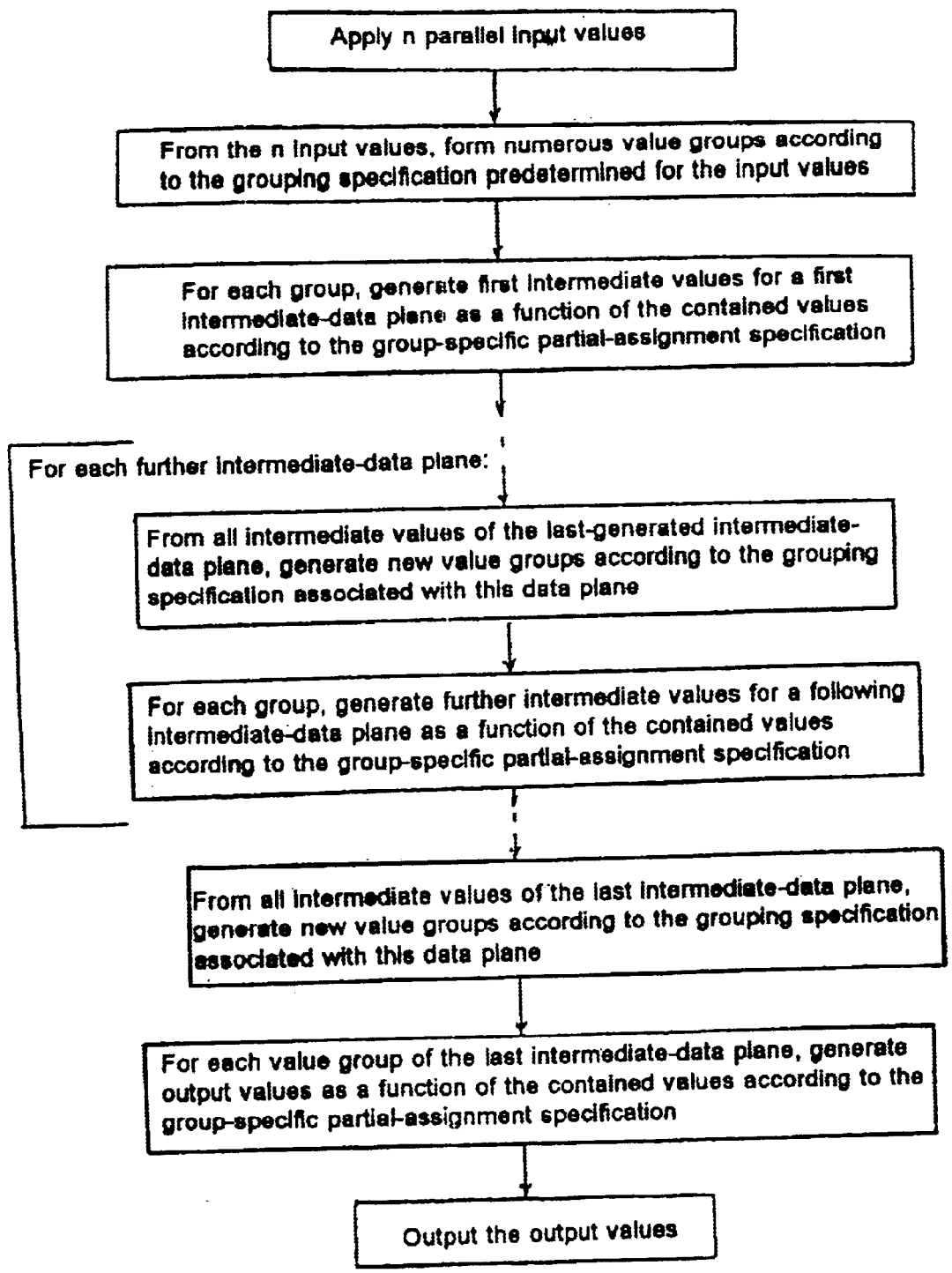
FIG. 1 a flow chart of the method of the invention.

The flow chart illustrated in FIG. 1 for the method of the invention, and the network cutout outlined in FIG. 2, explain the principle of the invention.

DETAILED DESCRIPTION

The initial point is an input variable e having n binary input positions e1 through en, which are applied in parallel to the network inputs. The input variables are, for example, the binary representation of a black-white raster image having raster elements arranged in lines and columns.

Within the network, a plurality of planes is defined corresponding to the continuous processing of parallel values, in particular an input-data plane EE, a first intermediate-data plane ZE1 and possibly further intermediate-data planes ZE2, . . . ZEr and an output-data plane AE, as well as numerous node planes KE1, KE2, KE(r+1), each having a plurality of network nodes. The number of binary positions is referred to as a dimension. The different data planes can have different dimensions. In particular, the m-position output variable can, in an extreme case, also have a single position, with m=1. The binary values occupying the positions in the input-data plane, the intermediate-data plane and the output-data plane are also referred to hereinafter as input values, intermediate values and output values, respectively.

A plurality of network nodes K11, K12, . . . , respectively having a plurality of inputs and outputs, is disposed in the first node plane KE1. In the example illustrated in FIG. 2, the number of inputs is identical to the number of outputs. The number of inputs or outputs of a node is referred to as its dimension k. The different nodes can have different dimensions. The input positions el through en of the input variables are individually present at one of the node inputs, so a grouping specification for the input positions is predetermined by the dimension and arrangement of the nodes.

The nodes respectively contain a partial-assignment specification, which, according to the value group at the inputs of the respective node, effects the provision of a group of binary values, as intermediate values of a first intermediate-data plane ZE1, at the node outputs. The nodes are preferably embodied as programmable read-only memories, particularly EEPROMs. The partial-allocation specification is then present as the contents of a programmable memory having the addressing inputs formed by the node inputs.

The totality of the intermediate values generated at the outputs of all nodes K11, K12, . . . of the first node plane KE1 constitutes the first intermediate-data plane ZE1. A network will usually, but not necessarily, have more than one KE1 intermediate-data plane. A second node plane KE2 in turn has a plurality of network nodes, whose inputs are connected to the outputs of the nodes of the preceding node plane KE. The connecting lines preferably have no branches, and the output-input assignments are thus unique. The association between certain outputs of the first node plane and certain inputs of the second node plane is referred to as a grouping specification of the intermediate-data plane ZE2, and is realized by the guidance of the connecting lines in the connecting segment V1. The arrangement of the individual nodes of the second node plane can be altered with a corresponding adaptation of the connecting lines shown in the connecting segment V1. The grouping specification remains unchanged by this.

In each node of the second node plane, further intermediate values of a second intermediate-data plane ZE2 are again generated at the outputs of the nodes of the second node plane KE2 according to the associated partial-assignment specification, as a function of the intermediate values of the intermediate-value group present at the inputs of the respective node.

The intermediate positions of the second intermediate-data plane ZE2, having been regrouped according to a grouping specification associated with this intermediate-data plane, are again guided to the inputs of a further node plane.

In this way, a plurality (r) of intermediate-data planes can be cascaded separately through node planes. The nodes of the node plane KE(r+1) following the last intermediate plane ZEr ultimately generate at their outputs the binary values of the output positions o1 through on of the illustrated example. The output values are outputted for further processing.

The processing steps described by way of the network shown in FIG. 2 can be practiced in an equivalent manner on a programmable digital computer. In particular, in a learning phase for determining a suitable network topology (node dimensions, node arrangements, connecting lines), in addition to partial-assignment specifications in the nodes, or with changing tasks, the practice of the method of the invention on a digital computer can be advantageous.

In the network shown in FIG. 2, different divisions of the network dimension n into the numerous nodes is provided in different node planes for clarifying the high flexibility in the embodiment of the topology in the device of the invention. Further examples of this are shown in FIG. 3 with a network having a consistently-unified node dimension and connecting lines that are guided in pairs, and in FIG. 4 with lines that are guided unchanged through a node plane. The guided line can be considered a limiting case of a node of the dimension one and an identical assignment of output value to input value.

Through a variable embodiment of the connecting-line segments (V1, V2 . . . in FIG. 2) between two node planes, for example in the form of switchable gates, the networks can be more flexible, but at the price of a larger switching outlay and additional gate transit times.

The networks shown in FIGS. 2 through 4 consistently possess the unified dimension n of the input variable e. Therefore, arbitrary transformation specifications for imaging the input variable onto the output variable cannot yet be realized. It can be seen that any arbitrary transformation specification can be realized through the expansion of the network dimension beyond the dimension n of the input variable e. A dimension expansion is attained in that one or a plurality of the nodes has a larger number of outputs ka than inputs ke, i.e., the value group provided at the node outputs has more positions than the value group present at the node inputs.

The maximum number of node inputs is preferably no larger than kemax=12, particularly no larger than kemax=8, whereas the number of binary positions of the input variable is typically n=64 or higher.

FIG. 5 shows a network section having two node planes, each having four nodes, with some of the nodes having more outputs than inputs. The node dimension increases from, for example, ke=4 to ka=6, or from ke=6 to ka=8. The dimension n=16 of the input-data plane increases in the first intermediate-data plane ZE1 to nZ1=n+4=20, and further to nZ2=26 in the second intermediate-data plane. The connecting segment V, which is not supposed to have any branches, maintains the dimension and merely effects a regrouping of the intermediate positions.

The significance of the dimension expansion is illustrated in a simple example, with reference to FIGS. 6 and 7. Shown is a value group of two binary, variable values a and b. A node K is intended to provide a function value for the boolean function f=(a∧b) at one of its outputs without an information loss. It is apparent that this requirement cannot be met with two node outputs. While it is simple to construct an assignment specification that generates the desired function value at one of two outputs, the other output does not suffice to maintain the original information scope. With the addition of a third output, however, the full information scope can be imparted from the input to the output in the form of the variable values a' and b', in addition to the function value f, with even an identical imaging of a, b onto a', b' being possible.

An expanded value table according to FIG. 7 can be constructed with the model of an auxiliary bit h at an additional input of the node k, as illustrated in FIG. 6.

A partial-assignment specification in the node means an imaging of all permissible value combinations at the node inputs onto value combinations at the node outputs. A loss of information is reliably avoided if the imaging is reversible. The quantity of permitted images can then be described as the quantity of all permutations of the quantity of permissible value combinations at the node inputs. For a node dimension k, there are $2^k!$ different, reversible images (assignment specifications). An imaging of a k-dimensional digital variable onto itself can also be classified as a hypermutation, in contrast to permutation, which is only a switching of positions of a multi-position variable. The partial-assignment specifications in the node are usually not permutation specifications. The reversibility is not a necessary characteristic of the partial-assignment specification.

Because the auxiliary bit in the model contains no information, it can be arbitrarily be assumed as constant, for example set at zero (indicated by a ground connection at the third node input). The number of possible input states is therefore again determined by the variable values a and b, and a reduced value table, framed in solid lines in FIG. 7, suffices for a reversible image. It can be seen that, with an expansion of the node dimension, any boolean function can be represented with a reversible image, that is, without an information loss. This applies both for the individual nodes and a network comprising a plurality of nodes. The scope of the dimension expansion, i.e., the number of auxiliary bits in the model of FIG. 6, is a function of the network topology and the image to be realized. It is apparent that an arbitrary transformation of an input variable of the dimension n can be realized with a network of the dimension $2n$ having nodes of a maximum dimension 3, in relation to the model of auxiliary bits, that is, with n auxiliary bits.

A reduction in the network dimension from one data plane to the next is also possible, and is practical for simplifying the network or a signal processing that is effected in a different way, if an associated loss of data content is acceptable. The reduction can be effected in one or a plurality of node planes.

For the case that a feature vector as an input variable having a high bit number is to be imaged onto-only a few output bits for classification, as is often the case in pattern recognition, in an imaging of the n-dimensional input variable onto an output variable of identical or larger dimensions, most of the positions in the output variable are not considered for further processing.

For these and comparable applications, connections, nodes and node outputs that make no contribution, or no notable contribution, to the binary values in the further-evaluated output positions can be removed. In particular, application-specific networks can be significantly simplified in this manner.

Figure 8A:
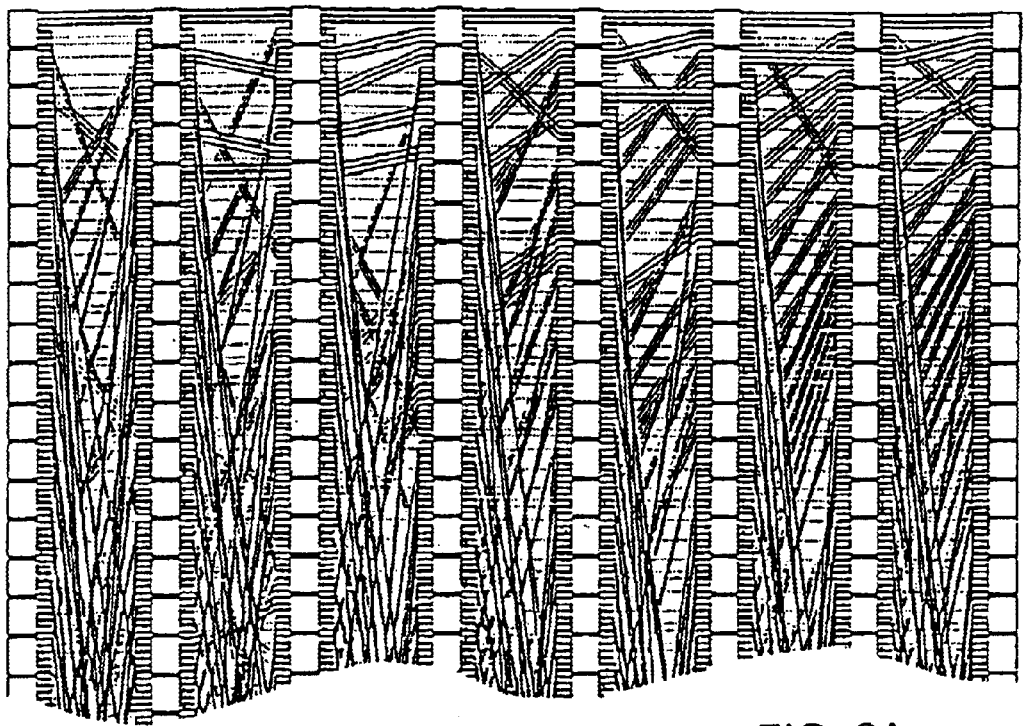
FIGS. 8A–8C the reduction of a network.
Figure 8B:
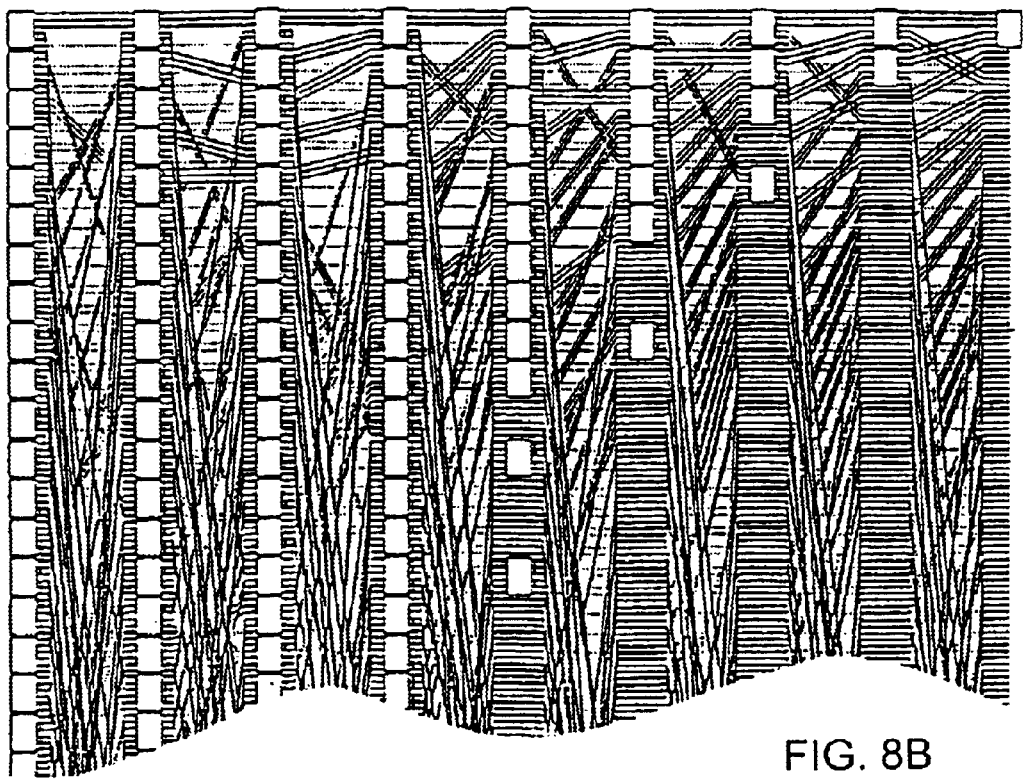
Figure 8C:
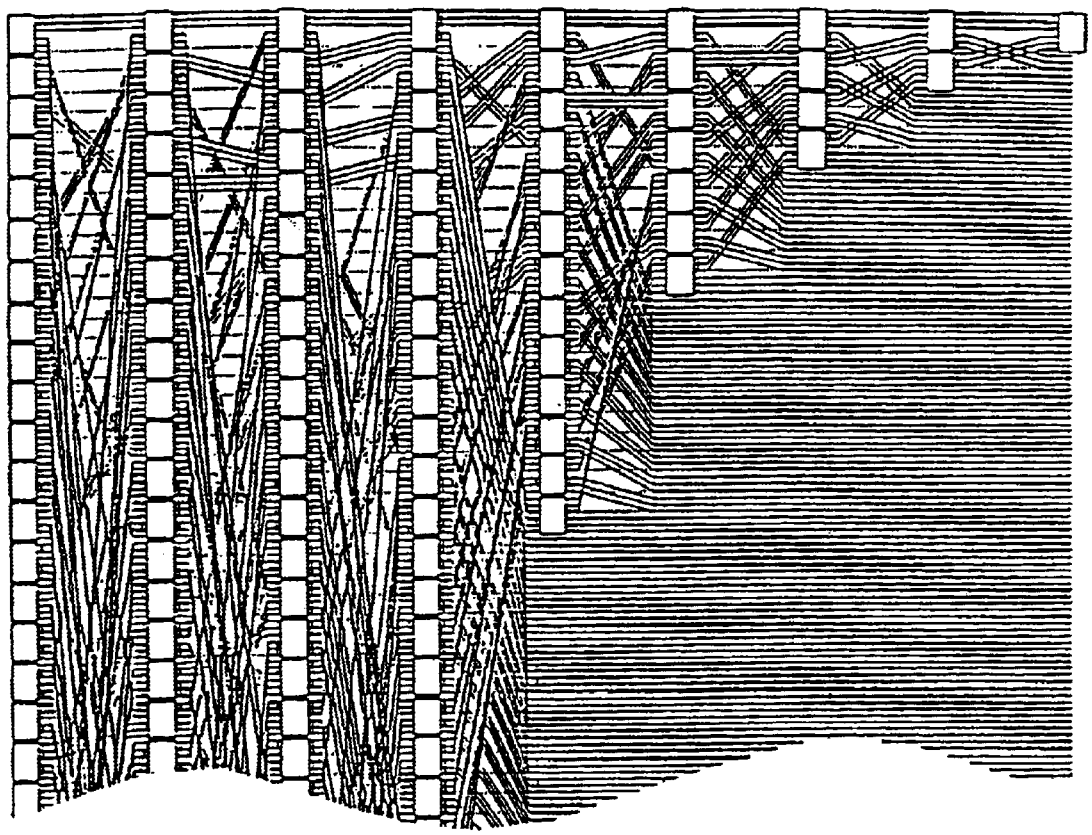

As an example, FIG. 8A shows a section of a network according to the present invention for recognizing a character from a raster image. Four bits of the output variables that can be conducted to the outputs of the uppermost node of the last node plane, as shown in the figure, suffice for classification. All nodes that have no impact on these four classification bits can be omitted for the task of character classification, which leads to a thinned network according to FIG. 8B. Through relocation of the remaining nodes, the thinned network can be shown more concentrated, as in FIG. 8C.

Finally, the output positions that are not required for classification can already be omitted as of the directly-connected nodes, which leads to a drastic reduction in the dimension in the last data planes.

What is claimed is:

1. A method of transforming an n-position input variable having n binary input positions into an m-position output variable having m binary output positions, comprising the steps of:

combining the n binary input positions in the form of groups according to a predeterminable grouping specification;

generating for each group in parallel, a plurality of group outputs as a function of the input positions according to group-specific partial assignment specifications so as to create a plurality of intermediate positions; and using sequential partial transformations on the group outputs so as to create further intermediate positions according to predeterminable, discrete partial-assignment specifications.

2. The method as recited in claim 1 further comprising combining the further intermediate positions in a first intermediate plane in the form of first intermediate plane groups according to predeterminable grouping specifications.

3. The method as recited in claim 2 further comprising combining further intermediate positions in a second intermediate plane in the form of second intermediate plane groups.

4. The method as recited in claim 3 further comprising combining last intermediate positions in a last intermediate plane in the form of last intermediate plane groups and transforming the last intermediate positions in the last intermediate plane into output positions using predeterminable partial assignment specifications.

5. The method as recited in claim 1 wherein in at least some of the partial assignment specifications the number of binary positions is increased.

6. The method as recited in claim 1 wherein a maximum dimension the groups is significantly smaller than a dimension of the input variable.

7. The method as recited in claim 6 wherein the maximum dimension of the groups is 12.

8. The method as recited in claim 6 wherein the maximum dimension of the groups is 8.

9. The method as recited in claim 4 further comprising imaging a set of binary sensor data as the input data for classification, and wherein the output positions are greater in number than the input positions.

10. The method as recited in claim 1 further comprising setting the predeterminable partial assignment specifications using learning samples.

11. An arrangement for transforming an n-position input variable having n binary input positions into an m-position output variable, the arrangement comprising:

(a) a network having a plurality of consecutive data planes including a data plane of input positions, a data plane of output positions and one or more intermediate planes between the data plane of input positions and the data plane of output positions;

(b) a plurality of parallel-operated nodes disposed between two of the plurality of consecutive data planes, each of the nodes including an addressable, programmable, readonly memory having a partial assignment specification in its memory and a plurality of address terminals as inputs and a plurality of outputs and capable of generating binary values at the plurality of outputs for the subsequent data plane from a group of binary values at the plurality of inputs in the preceding data plane according to the partial assignment specification; and (c) connections between the outputs of preceding parallel-operated nodes and inputs of subsequent nodes in the one or more intermediate planes.

12. The arrangement as recited in claim 11 wherein at least one of the plurality of nodes includes more outputs than inputs.

13. The arrangement as recited in claim 11 wherein a maximum dimension the plurality of nodes is significantly smaller than a dimension of the input variable.

14. The arrangement as recited in claim 11 wherein the maximum dimension of the nodes is 12.

15. The arrangement as recited in claim 11 wherein the maximum dimension of the nodes is 8.

16. The arrangement as recited in claim 11 wherein the connections between the inputs and outputs do not include branches.

17. The arrangement as recited in claim 11 in a pattern recognition system.

\* \* \* \* \*